United States Patent
Nakajima et al.

(10) Patent No.: US 10,578,814 B2
(45) Date of Patent: Mar. 3, 2020

(54) OPTICAL TRANSMISSION DEVICE, OPTICAL RECEPTION DEVICE, AND OPTICAL CABLE

(71) Applicant: SONY CORPORATION, Tokyo (JP)

(72) Inventors: Yasuhisa Nakajima, Kanagawa (JP); Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/544,980

(22) PCT Filed: Jan. 27, 2016

(86) PCT No.: PCT/JP2016/052350
§ 371 (c)(1),
(2) Date: Jul. 20, 2017

(87) PCT Pub. No.: WO2016/125658
PCT Pub. Date: Aug. 11, 2016

(65) Prior Publication Data
US 2017/0363824 A1    Dec. 21, 2017

(30) Foreign Application Priority Data
Feb. 5, 2015   (JP) ................ 2015-020916

(51) Int. Cl.
*G02B 6/26*    (2006.01)
*G02B 6/12*    (2006.01)
(Continued)

(52) U.S. Cl.
CPC ......... *G02B 6/4246* (2013.01); *G02B 6/3512* (2013.01); *G02B 6/42* (2013.01);
(Continued)

(58) Field of Classification Search
CPC .. G02B 6/4214; G02B 6/4292; G02B 6/3512; G02B 6/4244; G02B 6/4245; G02B 6/4246
(Continued)

(56) References Cited

U.S. PATENT DOCUMENTS 6,008,469 A    12/1999   Kawamura et al.
2004/0008920 A1   1/2004   Endicott
(Continued)

FOREIGN PATENT DOCUMENTS

CA    2221489 A1    9/1998
CN    101125392 A    2/2008
(Continued)

OTHER PUBLICATIONS

International Search Report and Written Opinion of PCT Application No. PCT/JP2016/052350, dated Feb. 23, 2016, 02 pages of English Translation and 07 pages of ISRWO.
(Continued)

Primary Examiner — Kaveh C Kianni
Assistant Examiner — Hung Q Lam
(74) Attorney, Agent, or Firm — Chip Law Group (57) ABSTRACT

An optical transmission device according to the present disclosure includes: an optical connector connection unit to which a connector unit of an optical cable is attached; a light emitting end configured to emit light to transmit an optical signal via the optical cable, and configured to radiate light to a reflection surface of the connector; and a driving unit configured to drive the reflection surface to refract the light radiated to the reflection surface toward an optical transmission path of the optical cable through refraction on the reflection surface in the case where the connector unit is attached in first orientation, and configured to drive the reflection surface to refract the light radiated to the reflection (Continued)

surface toward the optical transmission path of the optical cable through refraction on the reflection surface in the case where the connector unit is connected in second orientation that is different from the first orientation.

19 Claims, 8 Drawing Sheets

(51) Int. Cl.
 *G02B 6/42* (2006.01)
 *G02B 6/10* (2006.01)
 *G02B 6/35* (2006.01)
(52) U.S. Cl.
 CPC ......... *G02B 6/4214* (2013.01); *G02B 6/4244* (2013.01); *G02B 6/4292* (2013.01)
(58) Field of Classification Search
 USPC .................. 385/14, 18, 25, 31, 32, 129, 130
 See application file for complete search history.

(56) References Cited

U.S. PATENT DOCUMENTS

| | | | | |
|---|---|---|---|---|
| 2004/0114942 A1* | 6/2004 | Yee | ........................ | G02B 6/266 398/214 |
| 2006/0215954 A1* | 9/2006 | Jenkins | ................ | G02B 6/3596 385/18 |
| 2008/0035619 A1 | 2/2008 | Hamaguchi et al. | | |
| 2009/0066879 A1* | 3/2009 | Yamamoto | ........... | G02B 6/0006 349/62 |
| 2009/0231580 A1* | 9/2009 | Nagy | ................. | G02B 6/29311 356/326 |
| 2012/0201494 A1 | 8/2012 | Suzuki | | |

FOREIGN PATENT DOCUMENTS

| | | |
|---|---|---|
| CN | 202548374 U | 11/2012 |
| DE | 19748917 A1 | 10/1998 |
| EP | 1890240 A1 | 2/2008 |
| JP | 1993/21209 U | 3/1993 |
| JP | 10-263870 A | 10/1998 |
| JP | 3468660 B2 | 11/2003 |
| JP | 2004-126368 A | 4/2004 |
| JP | 2007-233325 A | 9/2007 |
| JP | 2008-043971 A | 2/2008 |
| JP | 4353219 B2 | 10/2009 |
| JP | 2012-163922 A | 8/2012 |
| JP | 2016-9059 A | 1/2016 |
| KR | 10-2008-0015370 A | 2/2008 |
| TW | 375547 B | 12/1999 |

OTHER PUBLICATIONS

Extended European Search Report of EP Patent Application No. 16746489.0, dated Jul. 30, 2018, 21 pages.

* cited by examiner

FIG. 10B $$\theta = \alpha \times V^2 \quad \cdots \text{FORMULA 2}$$

OPTICAL TRANSMISSION DEVICE, OPTICAL RECEPTION DEVICE, AND OPTICAL CABLE

CROSS REFERENCE TO RELATED APPLICATIONS

This application is a U.S. National Phase of International Patent Application No. PCT/JP2016/052350 filed on Jan. 27, 2016, which claims priority benefit of Japanese Patent Application No. JP 2015-020916 filed in the Japan Patent Office on Feb. 5, 2015. Each of the above-referenced application is hereby incorporated herein by reference in its entirety.

TECHNICAL FIELD

The present disclosure relates to optical transmission devices, optical reception devices, and optical cables.

BACKGROUND ART

In recent years, optical data transmission has become popular with rapid increase in communication capacity. However, the optical data transmission is mainly used for data transmission in a mission-critical system in an infrastructure in which vast amount of data is transmitted and for data transmission between data servers, and the optical data transmission is not popular in consumer use. In addition, a configuration of connection between devices and optical cables prioritizes certainty of connection, and such a configuration is not user-friendly for general users.

On the other hand, by using electrical data transmission that has already been popular in connection between devices for consumer use, it is possible for users without special tools or special skills to connect devices by themselves. In addition, in view of usability for users, it is desirable that a connector be inserted regardless of which way is up when attaching a cable to a device.

For example, Patent Literature 1 listed below describes a technology related to an optical connector configured to guide light into an optical transmission path having an optical axis direction different from an optical axis direction from a light output end, and guide the light to a light input end in an optical axis direction different from the optical transmission path.

In addition, Patent Literature 2 listed below describes a configuration of an optical connector having two optical connection surfaces. One optical connection surface is linearly connected with an optical transmission path of an optical cable, and the other optical connection surface is perpendicular to the optical transmission path.

In addition, Patent Literature 3 listed below describes a configuration in which orientation of an optical connector of an optical transmission device is the same as orientation of an optical connector of an optical reception device while optical connection is established through two opposing surfaces with respect to the optical connectors.

CITATION LIST

Patent Literature

Patent Literature 1: JP 2008-292962A
Patent Literature 2: JP 2007-240866A
Patent Literature 3: JP 2000-147333A

DISCLOSURE OF INVENTION

Technical Problem

However, according to the technologies described in the patent literatures, polarity of connectors in the up/down direction is unambiguously decided, and it is impossible to establish connection upside down or establish connection in another direction. Therefore, the user has to check the orientation of a connector when establishing connection, and there is a problem that convenience at the time of connection is reduced.

Therefore, it is desirable to make it possible to establish connection between devices for optical transmission even when the orientation of the connector is changed.

Solution to Problem

According to the present disclosure, there is provided an optical transmission device including: an optical connector connection unit to which a connector unit of an optical cable is attached; a light emitting end configured to emit light to transmit an optical signal via the optical cable, and configured to radiate light to a reflection surface of the connector unit; and a driving unit configured to drive the reflection surface to refract the light radiated to the reflection surface toward an optical transmission path of the optical cable through refraction on the reflection surface in the case where the connector unit is attached in first orientation, and configured to drive the reflection surface to refract the light radiated to the reflection surface toward the optical transmission path of the optical cable through refraction on the reflection surface in the case where the connector unit is connected in second orientation that is different from the first orientation.

In addition, according to the present disclosure, there is provided an optical reception device including: an optical connector connection unit to which a connector unit of an optical cable is attached; a light receiving end configured to receive an optical signal transmitted via the optical cable, and configured to receive light emitted from an optical transmission path of the optical cable and reflected by a reflection surface of the connector unit; and a driving unit configured to drive the reflection surface to refract the light emitted from the optical transmission path toward the light receiving end through refraction on the reflection surface in the case where the connector unit is attached in first orientation, and configured to drive the reflection surface to refract the light emitted from the optical transmission path toward the light receiving end through refraction on the reflection surface in the case where the connector unit is connected in second orientation that is different from the first orientation.

In addition, according to the present disclosure, there is provided an optical cable including: an optical transmission path in which an optical signal is transmitted; a connector unit that is provided at a terminal of the optical transmission path and attached to an optical connector connection unit of an external device; and a reflection surface that is provided in the connector unit and transmits the optical signal between the optical transmission path and a light emitting end or a light receiving end of the external device by reflecting light of the optical signal, the reflection surface being driven to a first position in the case where the connector unit is attached to the optical connector connection unit in first orientation, the reflection surface being driven to a second position in the case where the connector unit is attached to the optical connector connection unit in second orientation.

Advantageous Effects of Invention

As described above, according to the present invention, it is possible to establish connection between devices for optical transmission even when the orientation of the connector is changed.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Figure 1:
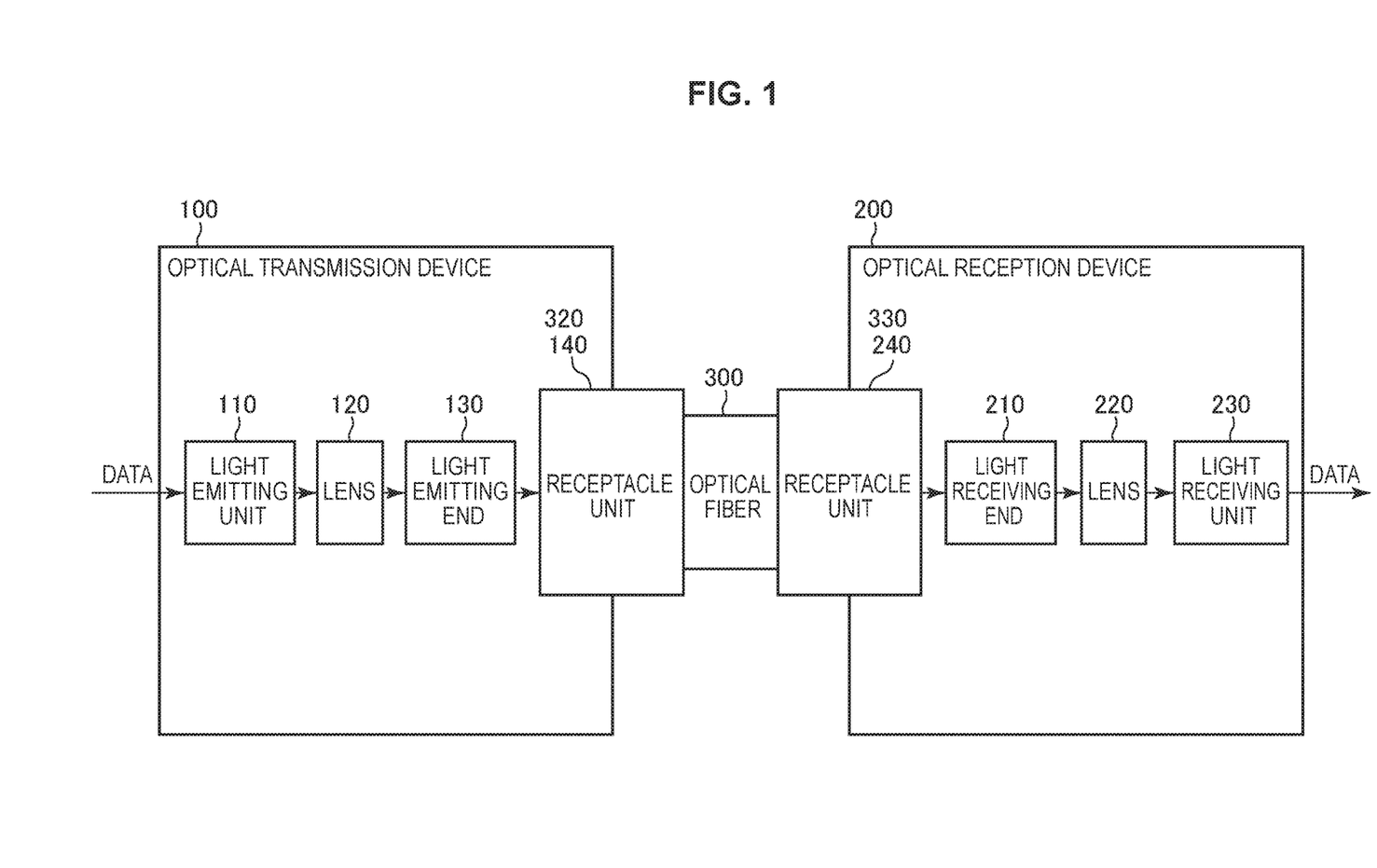
FIG. 1 is a schematic diagram illustrating a configuration of an optical cable system according to an embodiment of the present invention.

Noe that, the description is given in the following order.
1. Configuration of system according to embodiment of present invention
2. Configuration example of optical cable including plurality of transmission paths
3. Configuration example in which MEMS mirror is used as reflection surface 1. Configuration of System According to Embodiment of Present Invention First, with reference to FIG. 1, a configuration of a system according to an embodiment of the present invention will be described. As illustrated in FIG. 1, the system according to the embodiment includes an optical transmission device 100, an optical reception device 200, and an optical cable 300 configured to connect the optical transmission device 100 and the optical reception device 200.

The optical transmission device 100 includes a light emitting unit 100 of optical data, a lens 120, a light emitting end 130, and an optical connector receptacle unit 140. The optical reception device 200 includes a light receiving end 210, a lens 220, a light receiving unit 230, and an optical connector receptacle unit 240.

Figure 2:
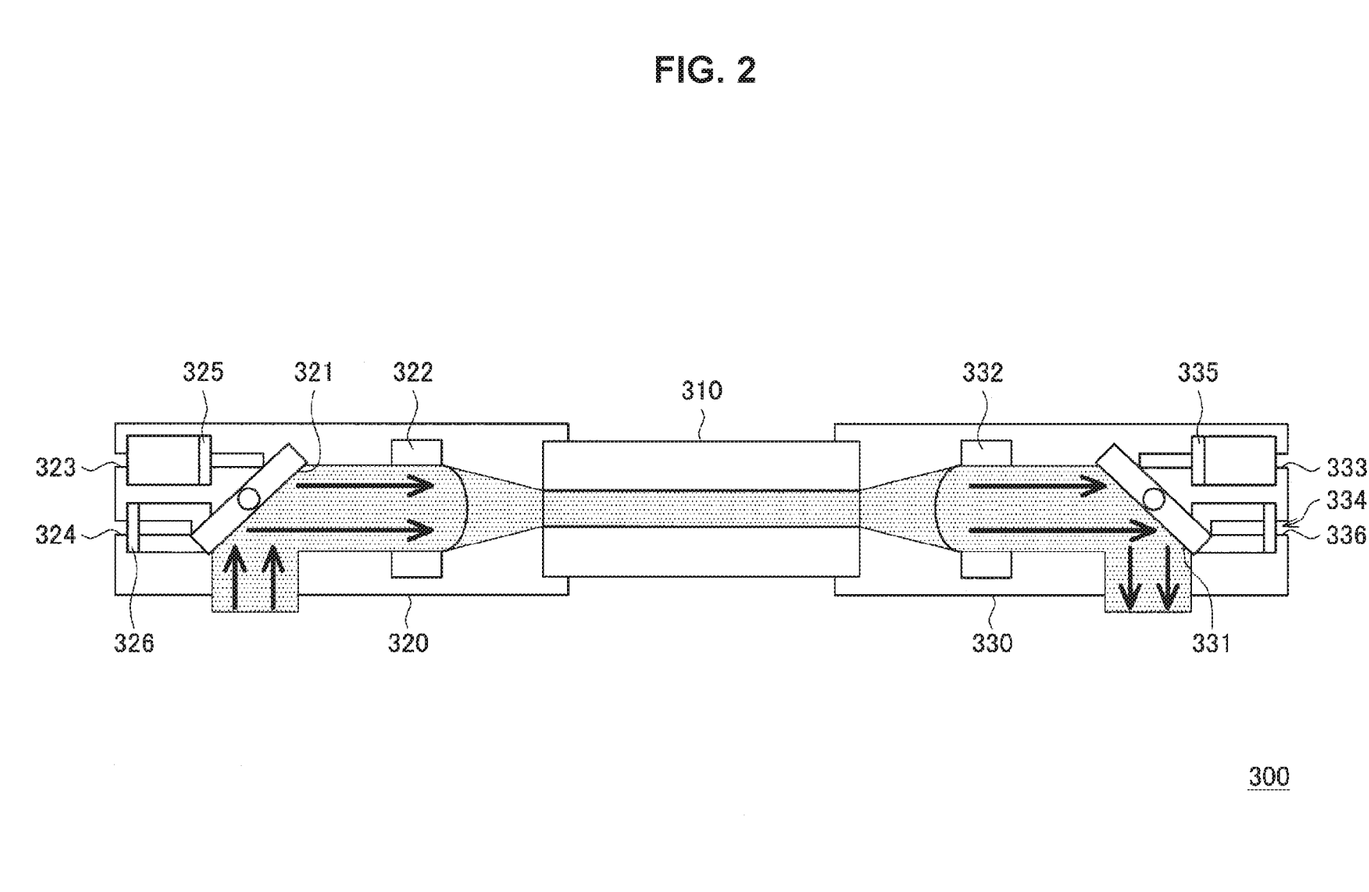
FIG. 2 is a schematic diagram illustrating a configuration of an optical cable.

FIG. 2 is a schematic diagram illustrating a configuration of the optical cable. The optical cable 300 includes an optical transmission path configured to transmit an optical signal, and optical connector units 320 and 330 that are provided at ends of the optical transmission path 310. Although the optical connector units 320 and 330 are not illustrated in FIG. 1, the optical connector unit 320 is attached to the optical connector receptacle unit 140, and the optical connector unit 330 is attached to the optical connector receptacle unit 240. Note that, it is also possible that the optical connector unit 320 is attached to the optical connector receptacle unit 240 and the optical connector unit 330 is attached to the optical connector receptacle unit 140.

The optical connector unit 320 includes a reflection surface 321 configured to guide light from the light emitting end 130 to the optical transmission path 310, a lens 322 configured to collect light from the reflection surface 321, and guide holes 323 and 324 and mediation mechanisms 325 and 326 configured to move the reflection surface 321 in accordance with an insertion direction of the optical connector unit 320. The optical connector unit 330 includes a lens 332 through which the light from the optical transmission path 310 passes, a reflection surface 331 configured to guide light from lens 332 to the light receiving end 210 of the optical reception device 200, and guide holes 333 and 334 and mediation mechanisms 335 and 336 configured to move the reflection surface 331 in accordance with an insertion direction of the optical connector unit 330.

The light emitting unit 110 of the optical transmission device 100 outputs video data, sound data, or other data to be transmitted from the optical transmission device 100 to the optical reception device 200 as an optical signal. Light emitted by the light emitting unit 110 as the optical signal is incident on the lens 120. For example, the incident light becomes parallel light through the lens 120, and the light emitting end 130 provided at the optical connector receptacle unit 140 emits the light to the reflection surface 321 of the optical connector unit 320. Note that, the lens 120 may be integrated with the light emitting end 130.

The optical signal emitted by the light emitting end 130 is incident on a side surface of the optical connector unit 320, and refracted in an optical axis direction of the optical transmission path 310 by the reflection surface 321. In the optical cable 300 illustrated in FIG. 2, the light emitted from the light emitting end 130 is refracted in the optical axis direction of the optical transmission path 310 by the reflection surface 321. The optical signal reflected by the reflection surface 321 is collected in the optical transmission path 310 through the lens 322, and transmitted through the optical transmission path 310. For example, the optical signal emitted from the optical transmission path 310 becomes parallel light through the lens 332. Subsequently, the optical signal is refracted by the reflection surface 331 and emitted from a side surface of the optical connector unit 330.

The optical signal emitted from the side surface of the optical connector unit 330 is incident on the light receiving end 210 in the optical connector receptacle unit 240 of the optical reception device 200. By using the optical cable 300 illustrated in FIG. 2, the light refracted by the reflection surface 331 is incident on the light receiving end 210. The light incident on the light receiving end 210 is collected through the lens 220, and received by the light receiving unit 230.

Figure 3:
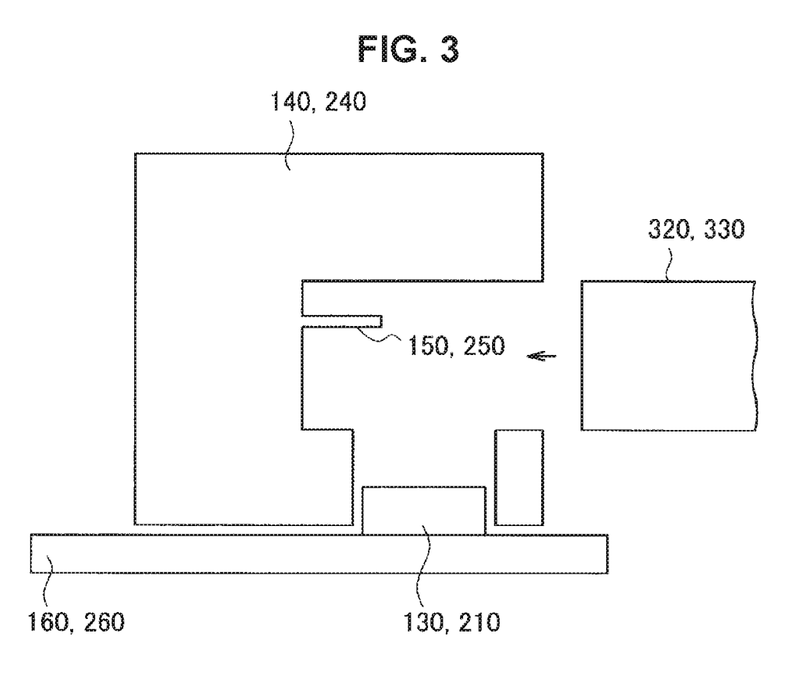
FIG. 3 is a schematic diagram illustrating a configuration of an optical connector receptacle unit.

FIG. 3 is a diagram illustrating configurations of the optical connector receptacle units 140 and 240 provided in the optical transmission device 100 and the optical reception device 200. The optical transmission device 100 includes a substrate 160, and the optical connector receptacle unit 140 is provided on the substrate 140. In addition, the light emitting end 130 is arranged on the substrate 160. In a similar way, the optical transmission device 200 includes a substrate 260, and the optical connector receptacle unit 240 is provided on the substrate 260. In addition, the light receiving end 210 is arranged on the substrate 260.

When the optical connector unit 320 is inserted into the optical connector receptacle unit 140 in the optical transmission device 100, a guide pin 150 provided on the optical connector receptacle unit 140 is inserted into any of guide holes 323 and 324. Thereby, it is possible to decide an insertion direction of the optical connector unit 320. In a similar way, when the optical connector unit 330 is inserted into the optical connector receptacle unit 240 in the optical reception device 200, a guide pin 250 provided on the optical connector receptacle unit 240 is inserted into any of guide holes 333 and 334. Thereby, it is possible to decide an insertion direction of the optical connector unit 330.

Figure 4:
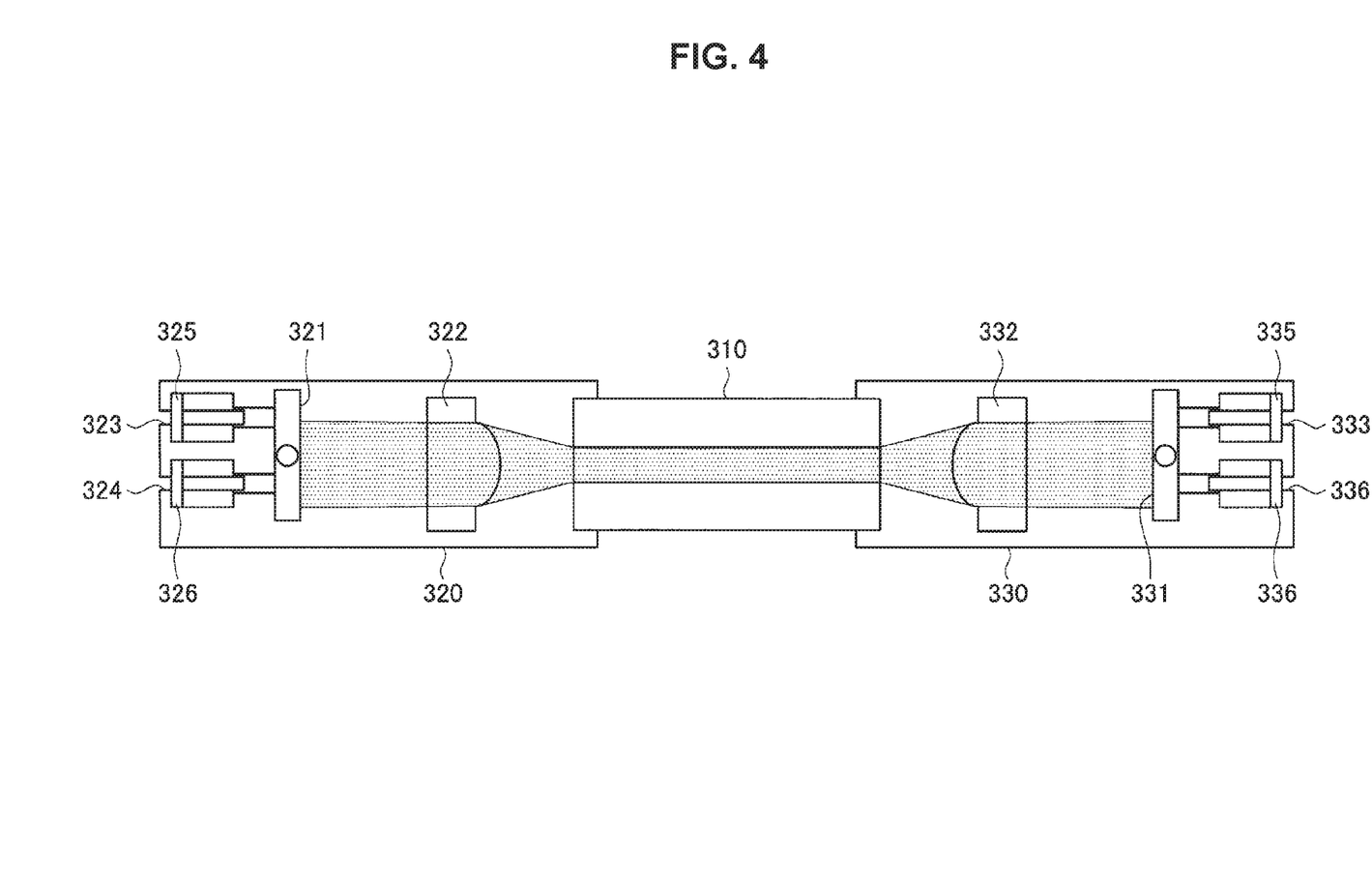
FIG. 4 is a schematic diagram illustrating a state where an optical connector unit of an optical cable is not inserted into an optical connector receptacle unit.

FIG. 4 is a schematic diagram illustrating inner states of the optical connector unit 320 and the optical connector unit 330 in the case where the optical connector unit 320 or the optical connector unit 330 of the optical cable 330 is not inserted into the optical connector receptacle unit 140 of the optical transmission device 100 or the optical connector receptacle unit 240 of the optical reception device 200. Since the guide pin 150 provided on the optical connector receptacle unit 140 of the optical transmission device 100 is not inserted into any of the guide holes 323 and 324, the mediation mechanisms 325 and 326 provided in the optical connector unit 320 cover the guide holes 323 and 324. Thereby, it is possible to surely prevent foreign substances such as dust from entering inside of the optical connector unit 320 through the guide holes 323 and 324. In addition, since the guide pin 250 provided on the optical connector receptacle unit 240 of the optical reception device 200 is not inserted into any of the guide holes 333 and 334, the mediation mechanisms 335 and 336 provided in the optical connector unit 330 cover the guide holes 333 and 334. Thereby, it is possible to surely prevent foreign substances such as dust from entering inside of the optical connector unit 330 through the guide holes 333 and 334.

Figure 5A:
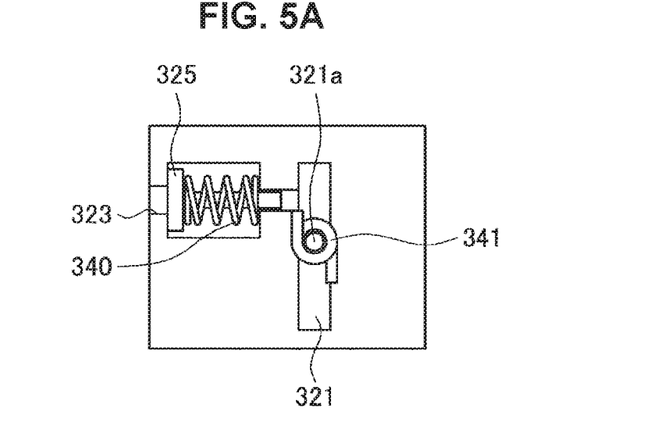
FIG. 5A is a schematic diagram illustrating a detail of operation of a mediation mechanism and a guide hole of an optical connector unit of an optical cable.
Figure 5B:
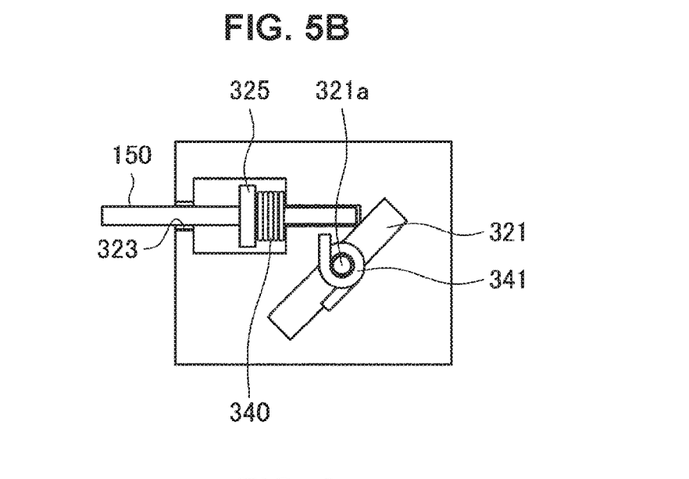
FIG. 5B is a schematic diagram illustrating a detail of operation of a mediation mechanism and a guide hole of an optical connector unit of an optical cable.

FIG. 5A and FIG. 5B are each a schematic diagram illustrating a detail of operation of the guide holes 323 and 324, the mediation mechanisms 325 and 326, and the reflection surface 321 of the optical connector unit 320 of the optical cable 300. Although FIG. 5A and FIG. 5B illustrates the guide hole 323, the mediation mechanism 325, and the reflection surface 321, the other guide holes, mediation mechanisms, and reflection surfaces provided in the optical connector unit 320 and the optical connector unit 330 operates in a similar way.

In the case where the optical connector unit 320 is not inserted into the optical connector receptacle unit 140 as illustrated in FIG. 5A, the mediation mechanism 325 is fixed at a position covering the guide hole 323 through power of a compression spring 340. In addition, the reflection surface 321 is fixed at a position extending in a direction perpendicular to the optical transmission path 310 illustrated in FIG. 3 through power of a helical spring 341 attached to a rotation axis 321a of the reflection surface 321. Thereby, it is possible to surely prevent foreign substances and the like from entering the guide hole 323. In addition, since the reflection surface 321 is positioned in the direction perpendicular to the optical transmission path 310, it is possible to surely suppress light from the optical transmission path 310 to be emitted from the side surface of the optical connector unit 320 in a state where the optical connector unit 320 is not inserted into the optical connector receptacle unit 140.

On the other hand, in the case where the optical connector unit 320 is inserted into the optical connector receptacle unit 140 as illustrated in FIG. 5B, the guide pin 150 is inserted into the guide hole 323, and the mediation mechanism 325 is pushed in a direction toward the reflection surface 321 by the guide pin 150. Thereby, the mediation mechanism 325 pushing a rear surface of the reflection surface 321 rotates the reflection surface 321 around the rotation axis 321a, and the optical signal incident from the side surface of the optical connector unit 320 is refracted in the optical axis direction of the optical transmission path 310 by the reflection surface 321.

As illustrated in FIG. 2, the two guide holes 323 and 324 are provided at opposing positions in an up/down direction with respect to the rotation axis 321a of the reflection surface 321 in the optical connector unit 320 of the optical cable 300. Accordingly, in the case where the optical connector unit 320 of the optical cable 300 is connected to the optical connector receptacle unit 140 in an upside down state with regard to the figure direction, the guide pin 150 is inserted into the guide hole 324 and the mediation mechanism 325 pushes the rear surface of the reflection surface 321. In this case, the light emitted from the light emitting end 130 is also refracted by the reflection surface 321 and guided to the optical transmission path 310. Thereby, the user can connect the optical cable 300 with the optical transmission device 100 regardless of orientation of the optical cable 300.

In a similar way, the two guide holes 333 and 334 are also provided at opposing positions in the up/down direction of the figure with respect to a rotation axis of the reflection surface 331 in the optical connector unit 330 of the optical cable 300. Accordingly, even in the case where the optical cable 300 is connected with the optical connector receptacle unit 240 of the optical reception device 200 in a state where the orientation of the optical connector unit 330 is upside down in the figure, light refracted by the lens 332 is refracted by the reflection surface 331 and guided to the light receiving end 210. Thereby, the user can connect the optical cable 300 with the optical reception device 200 regardless of orientation of the optical cable 300.

In addition, since the optical connector unit 320 has the same configuration as the optical connector unit 330, it is possible to transmit an optical signal from the optical transmission device 100 to the optical reception device 200 even if the optical connector unit 320 is connected with the optical connector receptacle unit 240 of the optical reception device 200 and the optical connector unit 330 is connected with the optical connector receptacle unit 140 of the optical reception device 100.

Therefore, according to the embodiment, the user can connect the optical transmission device 100 with the optical reception device 200 regardless of up/down orientation of the optical connector units 320 and 330, and it is possible to drastically improve convenience of users.

2. Configuration of Optical Cable Including Plurality of Transmission Paths

FIG. 1 illustrates the configuration the optical transmission device 100 including one light emitting unit 110, one lens 120, and one light emitting end 130 in accordance with the optical cable 300 including one optical transmission path 310. However, in the case where the optical cable 300 includes a plurality of optical transmission paths 310, the optical transmission device 100 may include a plurality of light emitting units 110, a plurality of lenses 120, and a plurality of light emitting ends 130. In a similar way, FIG. 1 illustrates the configuration the optical reception device 200 including one light receiving unit 230, one lens 220, and one light receiving end 210 in accordance with the optical cable 300 including one optical transmission path 310. However, in the case where the optical cable 300 includes a plurality of optical transmission paths, the optical reception device 200 may include a plurality of light receiving units 230, a plurality of lenses 220, and a plurality of light receiving ends 210.

Figure 6:
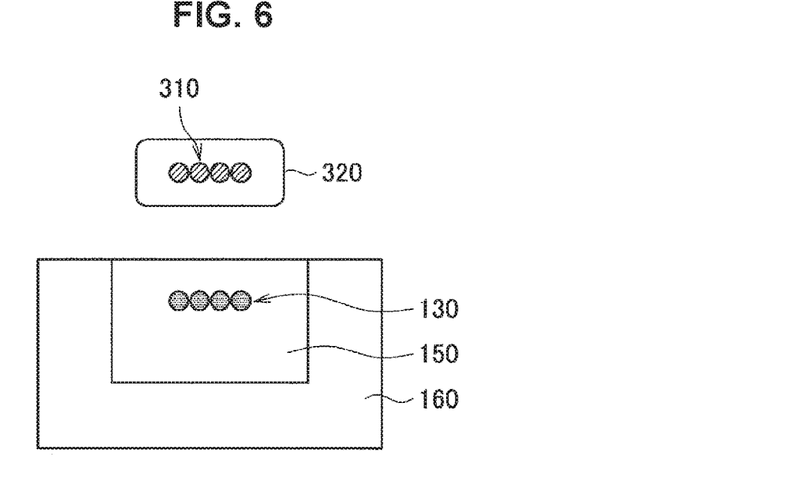
FIG. 6 is a schematic diagram illustrating an example of arrangement of plurality of light emitting ends of an optical cable each of which includes an optical transmission path.

As an example, FIG. 6 is a schematic diagram illustrating an arrangement example of the plurality of the light emitting ends 130 of the optical transmission device 100. In this example, the optical connector receptacle unit 150 provided on the substrate 160 of the optical transmission device 100 includes four light emitting ends 130. The four light emitting ends 130 are arranged in parallel with an end surface of the substrate 160. In addition, the light emitting ends 130 face four optical transmission paths 310 of the optical connector unit 320 at an end of the optical cable 300.

Note that, the number of the light emitting ends 130 is not limited to the number illustrated in FIG. 6. The number of the light emitting ends 130 may be the number illustrated in FIG. 6 or more, or the number illustrated in FIG. 6 or less. In addition, the arrangement of the light emitting ends 130 is not limited to the arrangement example illustrated in FIG. 6. The arrangement of the light emitting ends 130 may be different from the arrangement example illustrated in FIG. 6. In addition, FIG. 6 illustrates arrangement of the light emitting ends 130 in the optical transmission device 100, and the light receiving ends 310 may be similarly arranged in the optical reception device 200.

In addition, although FIG. 1 illustrates the example of one-way communication from the optical transmission device 100 to the optical reception device 200, the communication may be two-way communication. In addition, the lens 120 may be arranged at the position of the light emitting end 130, and the lens 220 may be arranged at the position of the light receiving end 210.

Figure 7:
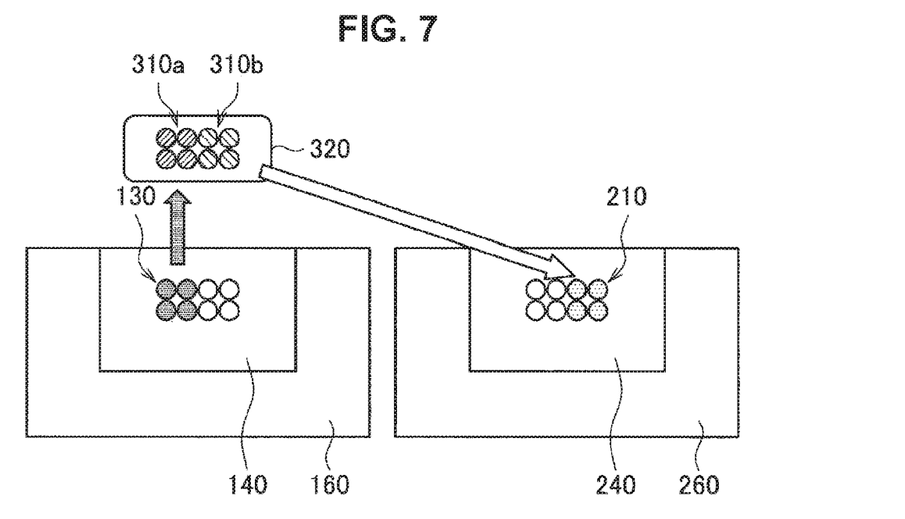
FIG. 7 is a schematic diagram illustrating channel array of an optical cable including a plurality of optical transmission paths, and arrangement relation of light emitting ends and receiving ends.

FIG. 7 is a schematic diagram illustrating an optical connector unit of the optical cable 300 in which the plurality of optical transmission paths 310 are arranged. Here, the optical cable 300 includes the optical transmission paths 310 of eight channels (two rows×four columns). In the example of FIG. 7, transmission channels 310a of two rows×two columns and reception channels 310b of two rows×two columns are arranged in the optical connector unit 320 of the optical cable 300. The transmission channels 310a face the light emitting ends 130 provided on the substrate 160 even in the case of refraction of 90 degrees by the reflection surface 321 provided in the optical connector unit 320. That is, light emitted from the four light emitting ends 130 in FIG. 7 is reflected by the reflection surface 321 and incident on four optical transmission paths 310 at the left side among the eight optical transmission paths 310. In addition, light emitted from the four optical transmission paths 310 at the left side among the eight optical transmission paths 310 is reflected by the reflection surface 331 and incident on the four light receiving ends 210. Therefore, the number of the reflection surfaces 321 in the optical connector unit 320 does not have to be equal to the number of the channels. One reflection surface is enough. In a similar way, the number of the reflection surfaces 331 in the optical connector unit 320 does not have to be equal to the number of the channels. One reflection surface is enough.

To prevent a laser product from harming users, "IEC60825/JISC6802: laser product safety standard" and "IEC60825/JISC6803: safety of laser product (safety of optical fiber communication system)" are defined as laser safety standards. Under the IEC60825/JISC6802, risks of operation of a device provided with a laser light source are defined by seven classes depending on laser exposure dose when using the device alone.

Optical fiber systems for consumer use should be in "Class 1" or "Class 1M" in the seven classes. In "Class 1", retinas are not damaged even when looking laser light for 100 seconds without blink. "Class 1M" is similar to "Class 1", but sometimes it will be dangerous if an auxiliary optical system such as a magnifying glass is used, and therefore warning display is necessary.

A prescribed value of output of laser light in "Class 1" and "Class 1M" (Accessible Emission Limit (AEL)) is calculated from the following equation 1 in the case where light wavelength is 700 nm to 1050 nm and an extended source is used. Note that, equations 2 to 4 are equations for calculating C4, C6, and T2 in the equation 1.

$$P = 7*10^{-4}*C_4*C_6*T_2^{-0.25}(W) \quad \text{(Equation 1)}$$

$$C_4 = 10^{0.002(\lambda-700)} \quad \text{(Equation 2)}$$

$$C_6 = \alpha/0.0015 \quad \text{(Equation 3)}$$

$$T_2 = 10 \times 10^{[(\alpha-0.0015)/98.5]} \quad \text{(Equation 4)}$$

Figure 8:
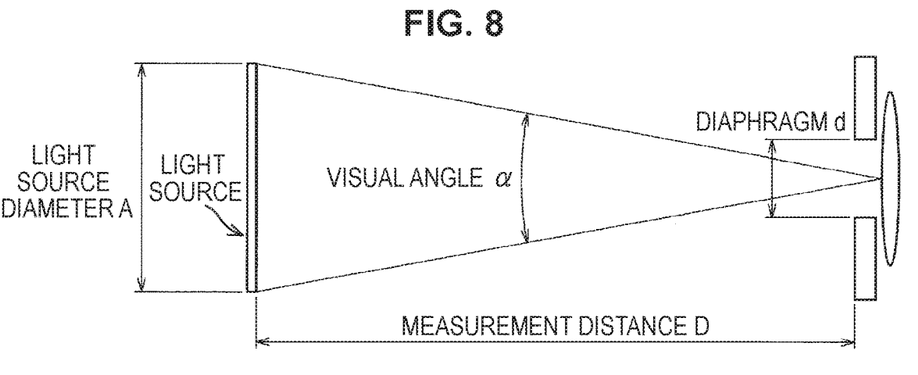
FIG. 8 is a schematic diagram illustrating an output control value under a safety standard of a laser light source.

Note that, in the equation 1, λ represents light wavelength of a light source used for transmission. In addition, as illustrated in FIG. 8, A represents a light source diameter that is a size of a light emitting end surface of the optical connector 300, and α represents a visual angle decided on the basis of measurement distance D (70 mm/100 mm/2000 mm) and the light source diameter A.

With reference to the equation 1, output P of the laser light depends on a length of the wavelength λ and the light source diameter A. In the case where the wavelength is constant, a method for increasing the light source diameter is the most effective in increasing the output P. Here, the light source diameter A is a horizontal and vertical average value in the case where a plurality of light sources are arranged dispersedly.

Figure 9:
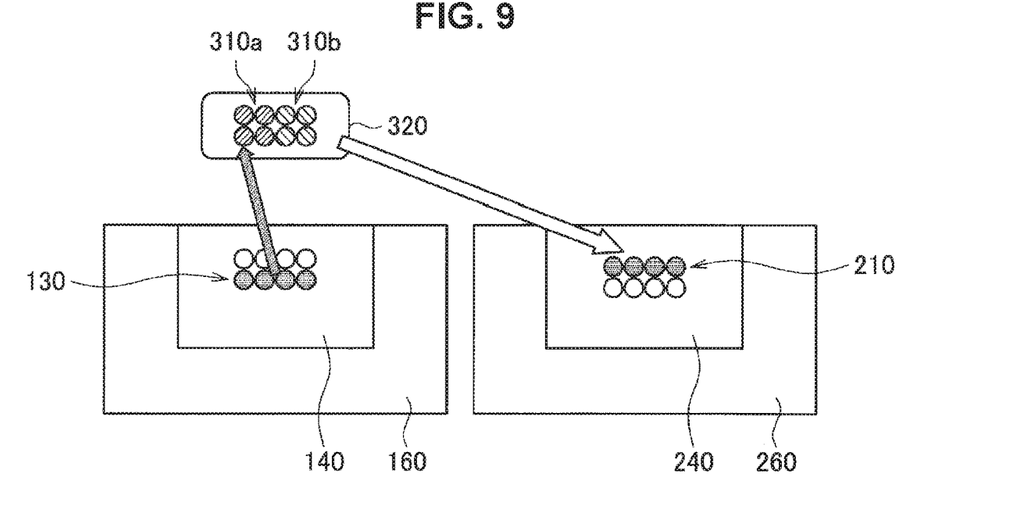
FIG. 9 is a schematic diagram illustrating channel array of an optical cable including a plurality of optical transmission paths, and arrangement relation of light emitting ends and receiving ends.

FIG. 9 illustrates an example of arrangement of the optical transmission paths (transmission channels) 310a and the optical transmission paths (reception channels) 310b under such circumstances. As illustrated in FIG. 9, four optical transmission paths 310 at the left side among the optical transmission paths 310 of 8 channels correspond to the transmission channels 310a, and four optical transmission paths 310 at the right side correspond to the reception channels 310b.

In addition, the light emitting ends 130 are arranged in line in the optical connector receptacle unit 140, and the light receiving ends 210 are arranged in line in the optical connector receptacle unit 240. As described above, it is possible to increase the output P of the laser light by arranging the light emitting ends 130 in line to increase the light source diameter.

Under channel arrangement illustrated in FIG. 9, the transmission channels 310a or the reception channels 310b cannot be connected in association with the light receiving ends 210 or the light emitting ends 130 even in the case of refraction by the reflection surface 321 or 331 with a constant refraction angle (in this case, 90 degrees) provided in the optical connector unit 320 or the optical connector unit 330. Therefore, it is necessary to set the number of the reflection surfaces 321 and 331 to the same as the number of channels and adjust reflection angles of each surface.

Since the light source diameter of the transmission channel 310a is small such as φ0.18 mm, it is difficult to obtain such a light source diameter by using a mechanistic reflection surface. On the other hand, movable micromirrors whose mirror size is about dozen micrometers have been in practical use due to development in technologies of microelectromechanical systems (MEMS) in recent years. By using such micromirrors as the reflection surfaces 321 and 331 according to the embodiment, it is possible to guide light from the respective light emitting ends 130 to the corresponding transmission channels 310a, and it is possible to guide the light from the transmission channels 310a to the corresponding light receiving ends 210. Next, details thereof will be described.

3. Example in Which MEMS Mirror is Used as Reflection Surface

Figure 10A:
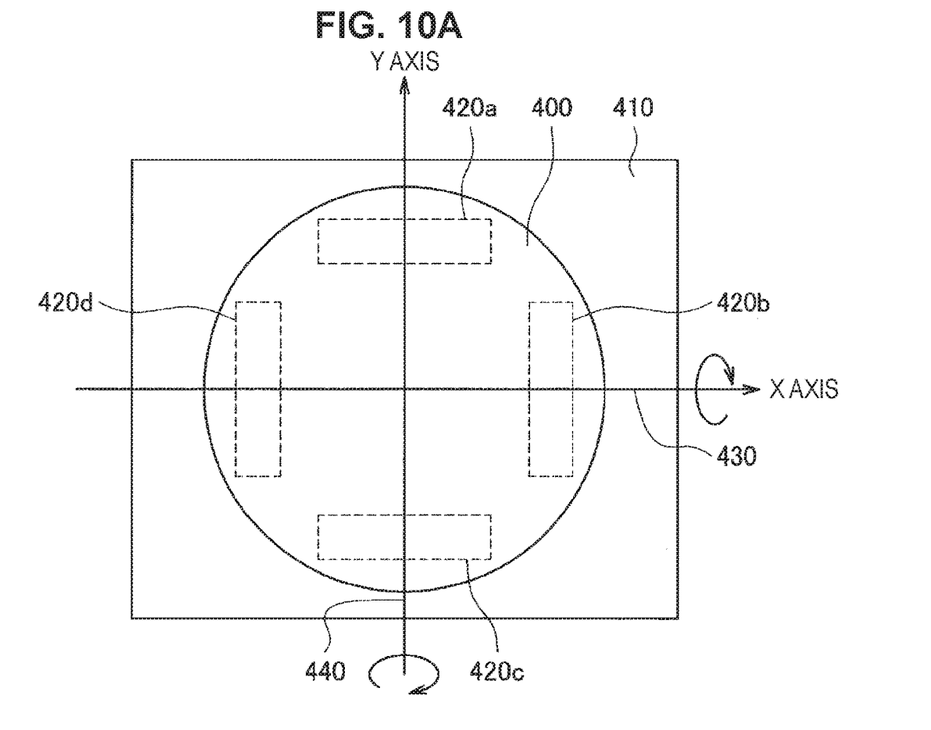
FIG. 10A is a schematic diagram illustrating a configuration of a MEMS mirror used as a reflection surface.
Figure 10B:
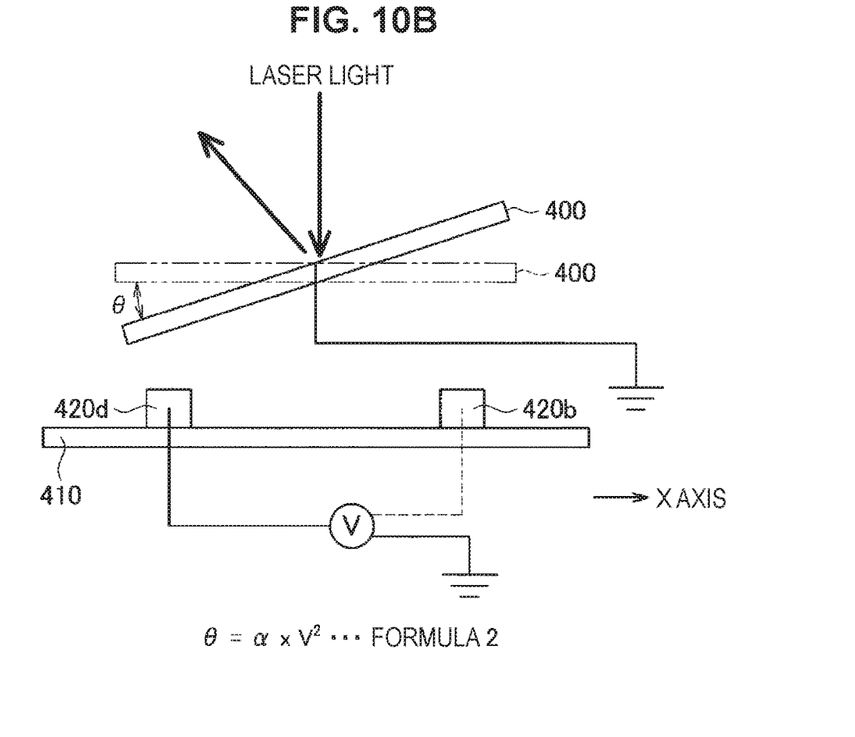
FIG. 10B is a schematic diagram illustrating a configuration of a MEMS mirror used as a reflection surface.

FIGS. 10A and 10B are schematic diagrams illustrating operation of a MEMS mirror. As illustrated in FIG. 10A, the MEMS mirror includes a mirror part 400, a substrate 410, and electrodes 420a to 420d. An X axis 430 represents a direction in which the electrodes 420b and 402d are arrayed, and a Y axis 440 represents a direction in which the electrodes 420a and 402c are arrayed. FIG. 10B illustrates a cross-section along the direction of the X axis 430. As illustrated in FIG. 10B, the mirror part 400 moves from a state represented with a dot-dash line to a state inclined at an angle of θ when voltage V is applied to the electrode 420d. In a similar way, the mirror part 400 moves to a state inclined at an angle of θ in an opposite direction when the voltage V is applied to the electrode 420d in an opposite direction.

The angle θ is an angle proportional to a square of the voltage V applied to each electrode. The following equation 5 represents the angle θ.

$$\theta = \alpha \times V^2 \qquad \text{(Equation 5)}$$

By applying appropriate voltage to directions of the X axis 430 and the Y axis 440 in such a way, it is possible to set inclination of the mirror part 400 to any angle θ. In addition, by adjusting angles θ of respective MEMS mirrors provided in the optical connector unit 320, it is possible to correctly connect the plurality of transmission channels 310a and reception channels 310b with the light receiving ends 210 and the light emitting ends 130 provided on the substrate 160 at any angles. As a result, flexible arrangement of the light emitting ends 130, the light receiving ends 210, and the transmission channels and reception channels in the optical transmission path 300 can be obtained, which enables optimal arrangement.

Figure 11:
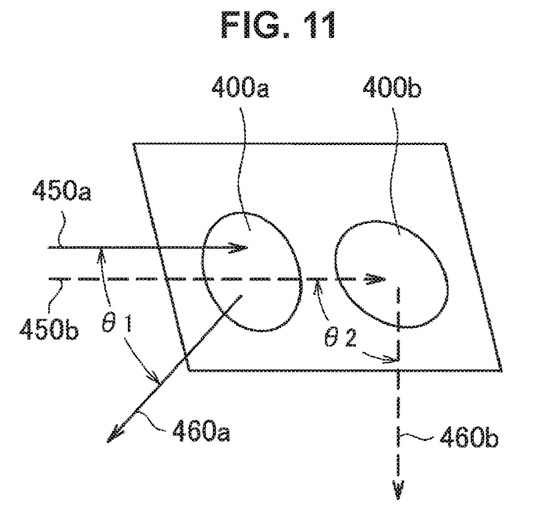
FIG. 11 is a schematic diagram illustrating reflection angle control of MEMS mirrors used as reflection surfaces.

FIG. 11 is a schematic diagram illustrating an example in which reflection angles θ are controlled differently in accordance with different voltages applied to different mirror parts 400a and 400b. On the mirror part 400a, incident light 450a is incident from the transmission channel 310a. The incident light 450a is reflected at an angle θ1 as reflection light 460a in accordance with a reflection angle formed by a voltage V1 applied to the MEMS mirror 400a. In a similar way, on the mirror part 400b, incident light 450b is incident from the transmission channel 310b. The incident light 450b is reflected at an angle θ2 as reflection light 460b in accordance with a reflection angle formed by a voltage V2 applied to the mirror part 400b. In such a way, it is possible to reflect the plurality of the incident light 450a and the incident light 450b at the different angles θ1 and θ2 and generate the reflection light 460a and the reflection light 460b.

Although FIG. 11 illustrates an example of the two mirror parts 400a and 400b, it is possible to arbitrarily arrange the transmission channels 310a, the reception channels 310b, the light emitting ends 130, and the light receiving ends 210 by arranging the necessary number of the mirror parts 400 and controlling an applied voltage of each mirror part even in the case where the optical transmission paths 310 of two rows×four columns are arrayed as illustrated in FIG. 9.

Figure 12:
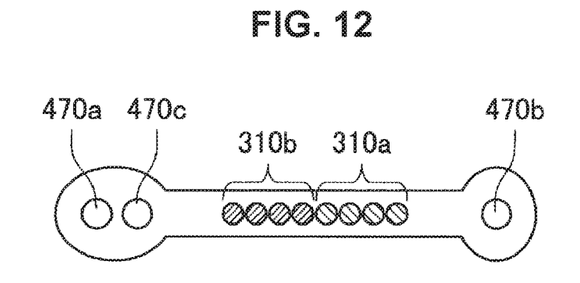
FIG. 12 is a schematic diagram illustrating cross-section of a cable in which optical transmission paths and copper wires are combined.

FIG. 12 is a schematic diagram illustrating cross-section of a composite cable for transmitting the optical signal, a voltage to be applied to the MEMS mirror, and a control signal thereof. The cross-section is perpendicular to the transmission direction. As illustrated in FIG. 12, by using the composite cable in which the optical transmission paths 310 (transmission channels 310a and reception channels 310b and copper wires 470a to 470c for transmitting electric signals are combined, it is possible to supply voltages to be applied to MEMS mirrors and control signals thereof from the transmission device 100 or the reception device 200 to the optical connector unit 320 or 330. Thereby, it is possible to drive the MEMS mirrors arranged in the optical connector units 320 and 330.

Figure 13:
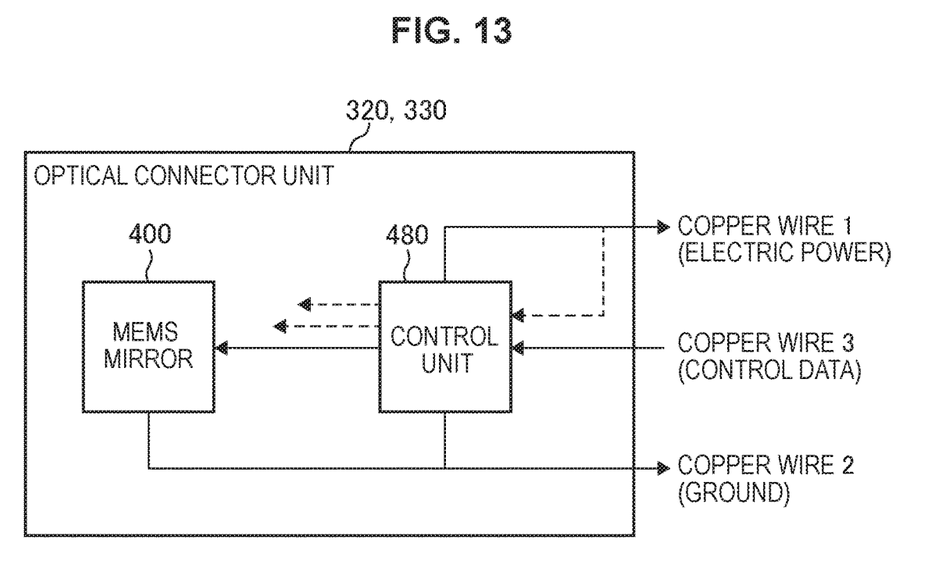
FIG. 13 is a schematic diagram illustrating a configuration of an angle control circuit of a MEMS mirror used as a reflection surface.

FIG. 13 is a schematic diagram illustrating a control unit of the MEMS mirror. As illustrated in FIG. 13, with regard to the control unit of the MEMS mirror, an electric power, a control signal, and a ground potential are respectively supplied to a control unit 480 embedded in the optical connector unit 320 or 330 through the copper wires 470a, 470b, and 470c of the optical cable 330. In addition, applied voltage control lines corresponding to the number of the mirror units 400 connect the control unit 480 and the respective mirror parts 400, and the reflection angles θ of the respective mirror parts 400 are set. In addition, as represented by a dashed line in FIG. 13, the control signal of the MEMS mirror may be superimposed on the copper wire 470a and transmitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An optical transmission device including:
an optical connector connection unit to which a connector unit of an optical cable is attached;
a light emitting end configured to emit light to transmit an optical signal via the optical cable, and configured to radiate light to a reflection surface of the connector; and
a driving unit configured to drive the reflection surface to refract the light radiated to the reflection surface toward an optical transmission path of the optical cable through refraction on the reflection surface in the case where the connector unit is attached in first orientation, and configured to drive the reflection surface to refract the light radiated to the reflection surface toward the optical transmission path of the optical cable through refraction on the reflection surface in the case where the connector unit is connected in second orientation that is different from the first orientation.

(2)
The optical communication device according to (1),
in which the driving unit rotates the reflection surface in accordance with movement of the connector unit in an attaching direction.

(3)
The optical communication device according to (2),
in which the driving unit includes a guide pin configured to push the reflection surface and rotate the reflection surface in accordance with movement of the connector unit in an attaching direction.

(4)
The optical communication device according to (3),
in which the guide pin rotates the reflection surface by pushing a mediation unit of the connector unit biased in a direction toward the optical connector connection unit back to a direction away from the optical connector connection unit in accordance with movement of the connector unit in an attaching direction.

(5)
The optical communication device according to (2),
in which the driving unit includes a first guide pin configured to rotate the reflection surface in a first direction in the case where the connector unit is attached in the first orientation, and a second guide pin configured to rotate the reflection surface in a second direction in the case where the connector unit is attached in the second orientation.

(6)
The optical transmission device according to any of (1) to (5),
in which the second orientation is orientation in which the connector unit is rotated 180° with respect to the first orientation while an attaching direction of the connector unit is treated as a rotation axis.

(7)
An optical reception device including:
an optical connector connection unit to which a connector unit of an optical cable is attached;
a light receiving end configured to receive an optical signal transmitted via the optical cable, and configured to receive light emitted from an optical transmission path of the optical cable and reflected by a reflection surface of the connector unit; and
a driving unit configured to drive the reflection surface to refract the light emitted from the optical transmission path toward the light receiving end through refraction on the reflection surface in the case where the connector unit is attached in first orientation, and configured to drive the reflection surface to refract the light emitted from the optical transmission path toward the light receiving end through refraction on the reflection surface in the case where the connector unit is connected in second orientation that is different from the first orientation.

(8)
The optical reception device according to (7),
in which the driving unit rotates the reflection surface in accordance with movement of the connector unit in an attaching direction.

(9)
The optical reception device according to (8),
in which the driving unit includes a guide pin configured to push the reflection surface and rotate the reflection surface in accordance with movement of the connector unit in an attaching direction.

(10)
The optical reception device according to (9),
in which the guide pin rotates the reflection surface by pushing a mediation unit of the connector unit biased in a direction toward the optical connector connection unit back to a direction away from the optical connector connection unit in accordance with movement of the connector unit in an attaching direction.

(11)
The optical reception device according to (8),
in which the driving unit includes a first guide pin configured to rotate the reflection surface in a first direction in the case where the connector unit is attached in the first orientation, and a second guide pin configured to rotate the reflection surface in a second direction in the case where the connector unit is attached in the second orientation.

(12)
The optical reception device according to any of (7) to (11),
in which the second orientation is orientation in which the connector unit is rotated 180° with respect to the first orientation while an attaching direction of the connector unit is treated as a rotation axis.

(13)
An optical cable including:
an optical transmission path in which an optical signal is transmitted;
a connector unit that is provided at a terminal of the optical transmission path and attached to an optical connector connection unit of an external device; and
a reflection surface that is provided in the connector unit and transmits the optical signal between the optical transmission path and a light emitting end or a light receiving end of the external device by reflecting light of the optical signal, the reflection surface being driven to a first position in the case where the connector unit is attached to the optical connector connection unit in first orientation, the reflection surface being driven to a second position in the case where the connector unit is attached to the optical connector connection unit in second orientation.

(14)

The optical cable according to (13), in which the reflection surface is driven by being pushed by a guide pin provided in the optical connector connection unit of the external device in accordance with movement of the connector unit toward the optical connector connection unit, the reflection surface is rotated to the first position in the case where the connector unit is attached to the optical connector connection unit in the first orientation, and the reflection surface is rotated to the second position in the case where the connector unit is attached to the optical connector connection unit in the second orientation.

(15)

The optical cable according to (14), including a mediation unit configured to be pushed by the guide pin in accordance with movement of the connector unit toward the optical connector connection unit, in which the mediation unit comes into contact with the reflection surface and rotates the reflection surface by being biased in a direction toward the optical connector connection unit and driven in a direction opposite to the direction biased by the guide pin.

(16)

The optical cable according to (15), in which the connector unit has a through hole into which the guide pin is inserted in accordance with movement of the connector unit toward the optical connector connection unit, and the mediation unit is driven by the guide pin inserted into the through hole.

(17)

The optical transmission device according to any of (13) to (16), in which the second orientation is orientation in which the connector unit is rotated 180° with respect to the first orientation while an attaching direction of the connector unit is treated as a rotation axis.

(18)

The optical cable according to (13), including:

a plurality of the optical transmission paths; and a plurality of the reflection surfaces corresponding to the plurality of optical transmission paths, in which the plurality of reflection surface are constituted by MEMS mirrors.

(19)

The optical cable according to (18), including a control unit configured to control the MEMS mirrors on the basis of control signals.

(20)

The optical cable according to (19), including a signal line configured to transmit the control signal in addition to the optical transmission path.

REFERENCE SIGNS LIST 100 optical communication device
130 light emitting end
140 optical connector receptacle unit
150 guide pin
200 optical reception device
210 light receiving end
240 optical connector receptacle unit
250 guide pin
260 substrate
300 optical cable
310 optical transmission path
320, 330 optical connector unit
321, 331, 333, 334 reflection surface
323, 324 guide hole
325, 326, 335, 336 mediation mechanism
340 spring for mediation mechanism
341 spring for reflection surface
400 mirror part
470 copper wire
480 control unit

The invention claimed is:

1. An optical transmission device, comprising:

an optical connector connection unit to which a connector unit of an optical cable is attached;

a light emitting end configured to emit light for transmission of an optical signal via the optical cable, wherein the light is radiated to a reflection surface in the connector unit of the optical cable; and a driving unit configured to rotate the reflection surface based on a movement of the connector unit in an attaching direction toward the optical connector connection unit, wherein the reflection surface is rotated for refraction of the light toward an optical transmission path of the optical cable, one of:

the reflection surface is driven to a first position when the connector unit is attached in a first orientation, or the reflection surface is driven to a second position when the connector unit is attached in a second orientation, and the second orientation is different from the first orientation.

2. The optical transmission device according to claim 1, wherein the driving unit includes a guide pin configured to push the reflection surface and rotate the reflection surface based on the movement of the connector unit in the attaching direction.

3. The optical transmission device according to claim 2, wherein the guide pin is further configured to rotate the reflection surface by push of a mediation unit, in the connector unit, in a direction away from the optical connector connection unit, based on the movement of the connector unit in the attaching direction, wherein the mediation unit is biased in a direction toward the optical connector connection unit.

4. The optical transmission device according to claim 1, wherein the driving unit includes:

a first guide pin configured to rotate the reflection surface in a first direction, when the connector unit is attached in the first orientation, and a second guide pin configured to rotate the reflection surface in a second direction, when the connector unit is attached in the second orientation.

5. The optical transmission device according to claim 1, wherein, in the second orientation, the reflection surface is rotated 180° with respect to the reflection surface in the first orientation, and wherein a rotation axis of the reflection surface is a center of the reflection surface and is perpendicular to an attaching direction of the connector unit toward the optical connector connection unit.

6. An optical reception device, comprising:

an optical connector connection unit to which a connector unit of an optical cable is attached;

a light receiving end configured to receive light emitted from an optical transmission path of the optical cable and reflected by a reflection surface in the connector unit, wherein the received light transmits an optical signal from an optical transmission device; and a driving unit configured to rotate the reflection surface based on a movement of the connector unit in an attaching direction toward the optical connector connection unit, wherein the reflection surface is rotated for refraction of the light toward an optical transmission path of the optical cable, one of:
  the reflection surface is driven to a first position when the connector unit is attached in a first orientation, or
  the reflection surface is driven to a second position when the connector unit is attached in a second orientation, and
  the second orientation is different from the first orientation.

7. The optical reception device according to claim 6, wherein the driving unit includes a guide pin configured to push the reflection surface and rotate the reflection surface, based on the movement of the connector unit in the attaching direction.

8. The optical reception device according to claim 7, wherein the guide pin is further configured to rotate the reflection surface by push of a mediation unit, in the connector unit, in a direction away from the optical connector connection unit, based on the movement of the connector unit in the attaching direction,
wherein the mediation unit is biased in a direction toward the optical connector connection unit.

9. The optical reception device according to claim 6, wherein the driving unit includes:
  a first guide pin configured to rotate the reflection surface in a first direction, when the connector unit is attached in the first orientation, and
  a second guide pin configured to rotate the reflection surface in a second direction, when the connector unit is attached in the second orientation.

10. The optical reception device according to claim 6, wherein, in the second orientation, the reflection surface is rotated 180° with respect to the reflection surface in the first orientation, and
wherein a rotation axis of the reflection surface is a center of the reflection surface and is perpendicular to an attaching direction of the connector unit toward the optical connector connection unit.

11. An optical cable, comprising:
an optical transmission path in which an optical signal is transmitted;
at least one connector unit that is provided at a terminal of the optical transmission path and is attached to an optical connector connection unit of an external device; and
a reflection surface that is provided in the at least one connector unit, wherein the reflection surface is configured to transmit the optical signal between the optical transmission path and one of a light emitting end or a light receiving end of the external device by reflection of light which contains the optical signal, wherein
the reflection surface is rotated for refraction of the light toward the optical transmission path of the optical cable based on a movement of the at least one connector unit in an attaching direction toward the optical connector connection unit, one of:
  the reflection surface is driven to a first position when the at least one connector unit is attached to the optical connector connection unit in a first orientation, or
  the reflection surface is driven to a second position when the at least one connector unit is attached to the optical connector connection unit in a second orientation, and
  the second orientation is different from the first orientation.

12. The optical cable according to claim 11, wherein the reflection surface is driven by a push of a guide pin provided in a driving unit of the of the external device based on the movement of the at least one connector unit in the attaching direction toward the optical connector connection unit, and
wherein one of:
  the reflection surface is rotated to the first position when the at least one connector unit is attached to the optical connector connection unit in the first orientation, or
  the reflection surface is rotated to the second position when the at least one connector unit is attached to the optical connector connection unit in the second orientation.

13. The optical cable according to claim 12, further comprising:
  a mediation unit configured to be pushed by the guide pin based on the movement of the at least one connector unit in the attaching direction toward the optical connector connection unit,
  wherein the mediation unit comes into contact with the reflection surface based on the push by the guide pin,
  wherein the mediation unit is further configured to rotate the reflection surface based on a bias in a direction toward the optical connector connection unit, and
  wherein the mediation unit is further configured to be pushed a direction away from the optical connector connection unit.

14. The optical cable according to claim 13, wherein the at least one connector unit has a through hole into which the guide pin is inserted based on the movement of the at least one connector unit in the attaching direction toward the optical connector connection unit, and
wherein the mediation unit is driven by the guide pin inserted into the through hole.

15. The optical cable according to claim 11, wherein, in the second orientation, the reflection surface is rotated 180° with respect to the reflection surface in the first orientation, and
wherein a rotation axis of the reflection surface is a center of the reflection surface and is perpendicular to an attaching direction of the at least one connector unit toward the optical connector connection unit.

16. The optical cable according to claim 11, further comprising:
  a plurality of optical transmission paths; and
  a plurality of reflection surfaces corresponding to the plurality of optical transmission paths,
  wherein the plurality of reflection surfaces is constituted by micro-electro-mechanical systems (MEMS) mirrors.

17. The optical cable according to claim 16, further comprising:
  a control unit configured to control the MEMS mirrors based on control signals.

18. The optical cable according to claim 17, further comprising:
a signal line configured to transmit the control signals.

19. The optical transmission device according to claim 3, wherein
the mediation unit is fixed at a first position corresponding to the pushed guide pin via a compression spring, and
the reflection surface is fixed at a second position, that is perpendicular to the optical transmission path, via a helical spring.

* * * * *